United States Patent
Yamada et al.

(10) Patent No.: US 7,178,046 B2
(45) Date of Patent: Feb. 13, 2007

(54) HALTING CLOCK SIGNALS TO INPUT AND RESULT LATCHES IN PROCESSING PATH UPON FETCHING OF INSTRUCTION NOT SUPPORTED

(75) Inventors: Tetsuya Yamada, Kawasaki (JP); Tomoichi Hayashi, Kokubunji (JP); Sadaki Nakano, Kokubunji (JP); Takanobu Tsunoda, Kokubunji (JP); Osamu Nishii, Inagi (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 11/095,685

(22) Filed: Apr. 1, 2005

(65) Prior Publication Data

US 2005/0169086 A1 Aug. 4, 2005

Related U.S. Application Data

(63) Continuation of application No. 09/603,965, filed on Jun. 26, 2000, now Pat. No. 6,877,087.

(30) Foreign Application Priority Data

Jul. 9, 1999 (JP) .................................. 11-195409

(51) Int. Cl.
G06F 1/32 (2006.01)
G06F 9/30 (2006.01)

(52) U.S. Cl. ...................... 713/322; 712/213; 712/214; 712/226

(58) Field of Classification Search ...................... None
See application file for complete search history.

(56) References Cited

U.S. PATENT DOCUMENTS

| 4,167,778 | A | | 9/1979 | Sipple | |
|---|---|---|---|---|---|
| 4,590,553 | A | * | 5/1986 | Noda | 713/320 |
| 5,031,096 | A | | 7/1991 | Jen | |
| 5,212,693 | A | | 5/1993 | Chao | |
| 5,392,437 | A | * | 2/1995 | Matter et al. | 713/324 |
| 5,619,408 | A | | 4/1997 | Black | |
| 5,742,794 | A | | 4/1998 | Potter | |
| 5,825,674 | A | * | 10/1998 | Jackson | 713/321 |
| 5,860,000 | A | * | 1/1999 | Biswas et al. | 712/244 |
| 5,940,311 | A | * | 8/1999 | Dao et al. | 708/204 |
| 6,438,680 | B1 | | 8/2002 | Yamada | |

FOREIGN PATENT DOCUMENTS

EP 0 884 677 12/1998

(Continued)

*Primary Examiner*—Kenneth S. Kim
(74) *Attorney, Agent, or Firm*—Antonelli, Terry, Stout and Kraus, LLP.

(57) ABSTRACT

A microprocessor includes a first cache memory, a first instruction fetch unit, a first instruction decoder, a first processing unit and a first latch that holds a control signal outputted from the first instruction decoder. When the first instruction fetch unit receives a first instruction performed by the first processing unit it outputs the first instruction to the first instruction decoder. When the first instruction fetch unit receives a second instruction which is not performed by the first processing unit, it outputs a specific instruction to the first instruction decoder, after which the supply of clock pulses to other latch circuits In the first processing unit is halted based on the control signal.

7 Claims, 8 Drawing Sheets

FOREIGN PATENT DOCUMENTS

| | | |
|---|---|---|
| JP | 04-111127 | 4/1992 |
| JP | 06-119168 | 4/1994 |
| JP | 08-101820 | 4/1996 |
| JP | 11-003225 | 1/1999 |
| JP | 11-024928 | 1/1999 |
| JP | 2001-075804 | 3/2001 |

* cited by examiner

```
1 FADD  FR0, FR1   ; FPU INSTRUCTION  1
2 ADD   R0, R1     ; CPU INSTRUCTION  1
3 SUB   R2, R3     ; CPU INSTRUCTION  2
4 FDIV  FR2, FR3   ; FPU INSTRUCTION  2
5 SHAD  R4, R5     ; CPU INSTRUCTION  3
6 OR    R6, R7     ; CPU INSTRUCTION  4
```

FIG.3

```
1 FADD  FR0, FR1   ; FPU INSTRUCTION  1
2 NOP              ; CPU INSTRUCTION  1
3 NOP              ; CPU INSTRUCTION  2
4 FDIV  FR2, FR3   ; FPU INSTRUCTION  2
5 NOP              ; CPU INSTRUCTION  3
6 NOP              ; CPU INSTRUCTION  4
```

HALTING CLOCK SIGNALS TO INPUT AND RESULT LATCHES IN PROCESSING PATH UPON FETCHING OF INSTRUCTION NOT SUPPORTED

CROSS REFERENCE TO RELATED APPLICATION

This is a continuation of U.S. application Ser. No. 09/603,965, filed Jun. 26, 2000, now U.S. Pat. No. 6,877,087 the contents of which are incorporated herein by reference.

FIELD OF THE INVENTION

This invention relates to a microprocessor, and relates in particular to a microprocessor technology suited for use in low power consumption microprocessors such as used in portable battery-powered electronic equipment such as PDA (personal digital assistant) and mobile computers, having a co-processor with custom circuits for particular applications such as a digital signal processor (DSP) or a floating-point processor unit (FPU).

BACKGROUND OF THE INVENTION

Microprocessors in portable electronic equipment besides having a fast processing speed, must also have low power consumption to allow operation on battery power for long periods of time. Technology is known in the related art for using co-processors such as FPU (floating-point units) in microprocessors to attain fast processing speeds.

The following technology for low power consumption in microprocessors is also known in the related art.

Portable electronic devices are in standby for long periods of time so a low power (hereafter called power-saving mode) consumption mode is available for use while in standby so a method of the related art lowers the clock frequency used to operate the microprocessor during standby. More specifically, a clock divider lowers the clock frequency and supplies this frequency to the microprocessor when the lower power consumption mode is selected. The clock power consumption and the power used by transistor switching (per unit time) are thus reduced and the microprocessor thus achieves a state of low power consumption.

Another method, different from the method for lowering the clock frequency during standby, cuts off the supply of clock pulses to unused modules. The user break controller for instance, is a circuit for easy debugging of a program and so is not normally used during processor operation. Modules such as the user break controller which are not used during normal operation will not cause problems with operation even if the supply of clock pulses is cut off. This method for cutting off the supply of clock pulses is more effective than the method for lowering the clock frequency. As a specific measure to cut off the supply of clock pulses, unused modules are individually set in a control register for controlling the cutoff of the clock pulses, when an instruction to halt the clock is issued in order to save power, the supply of clock pulses to the modules set in the control register is halted. The power consumption in the modules set in the control register therefore decreases to zero. To use a module set in the control register, the specified module is reset by an interrupt (break-in) and the supply of clock pulses re-started. However, this method for cutting off the supply of clock pulses to a module is costly in terms of time and effort involving operations such as setting values in the register, and is not suited for modules that must often be run or stopped.

A method is disclosed in Japanese Patent Prepublication No. 8-101820 for generating an NOP (No operation) control signal for stopping internal circuit operation of the data base when data base operation is to be halted in order to save power. In this method, instructions are decoded and when decoding results are that data base operation is not to be performed, a one bit NOP signal CC=1 is issued. The control signal is fixed when the NOP signal CC=1 is issued and the latch for the data base control signal cannot be rewritten (changed). The data base input/output (I/O) latch also cannot be rewritten (changed) and the input/output data is kept at the same values. The input/output data does not change at this time, so no switching occurs in the data base and current consumption (power saving) can be achieved.

The method for generating an NOP (No operation) control signal for stopping internal circuit operation of the data base however had the following problems.

The NOP signal generation method was intended to reduce power consumption in the data base so there was no reduction in power consumed in the control section of the decoder. Besides controlling the issuing of instructions, the decoder control section, also performs tasks such as logic processing for generating control signals and non-routine (exceptional) task processing. The power consumption during these tasks cannot be ignored.

Adding a separate circuit as an energy conserving (power saving) circuit is also preferable from the viewpoint of IP (intellectual property) rights because using a separate circuit means there is no need to internally change a part functioning as a Co-processor and regarded as an intellectual property. The labor (man-hours) normally needed for verifying internal circuit changes in the IP (intellectual property) are therefore not required.

In view of the above problems with the related art, this invention has the object of providing a microprocessor achieving low power consumption with a simple structure by using an additional circuit to reduce power consumption in data base sections and control sections such as the decoder.

These and other objects of the invention as well as the unique features of the invention will be clarified from the following description of this invention and from the drawings.

SUMMARY OF THE INVENTION

In order to achieve the above mentioned objects, the microprocessor of a typical embodiment of this invention is comprised of a discriminator circuit to accept instructions, an instruction selector circuit controlled by the discriminator circuit, an instruction decoder to decode the instructions, and a processing circuit to perform calculations according to the decoding results from the instruction decoder, wherein a first instruction is supplied to the instruction decoder when an instruction is input to the discriminator circuit that is different from the instruction to perform calculation in the processing circuit. Thus, when an unrelated instruction is input, the switching inside the decoder is decreased, the transistor switching is decreased, the through current in the transistors is decreased and the power consumption in the decoder is decreased.

Further, a microprocessor of another typical embodiment of this invention is comprised of a discriminator circuit to accept instructions, an instruction invalidation logic circuit controlled by the discriminator circuit, an instruction register to accept the instructions, an instruction decoder to decode the output of the instruction register, and a processing circuit to perform calculations according to the decoding results from the instruction decoder, wherein the supply of clock pulses to the instruction register is halted when the instruction invalidation logic circuit is input with an instruction different from the instruction to perform calculations in the calculation circuit. Thus, the operation of the instruction register stops, and no instructions are output to the instruction decoder from the instruction register. In other words, as related above, the electrical current through the transistors inside the decoder diminishes, and power consumption in the decoder is reduced.

Still further, a microprocessor of another typical embodiment of this invention is comprised of a discriminator circuit to accept instructions, an instruction invalidation logic circuit controlled by the discriminator circuit, a switching circuit to receive the instructions, an instruction decoder to decode the output of the switching circuit, and a processing circuit to perform calculations according to the decoding results from the instruction decoder, wherein the switching circuit opens and stops the supply of instructions to the instruction decoder when the discriminator circuit is input with an instruction different from the instruction to perform calculations in the calculation circuit. The power consumption in the instruction decoder can therefore be reduced the same as previously described.

DETAILED DESCRIPTION OF THE PREFERRED EMBODIMENTS

Typical embodiments of this invention are hereafter described while referring to the accompanying work drawings.

Figure 1:
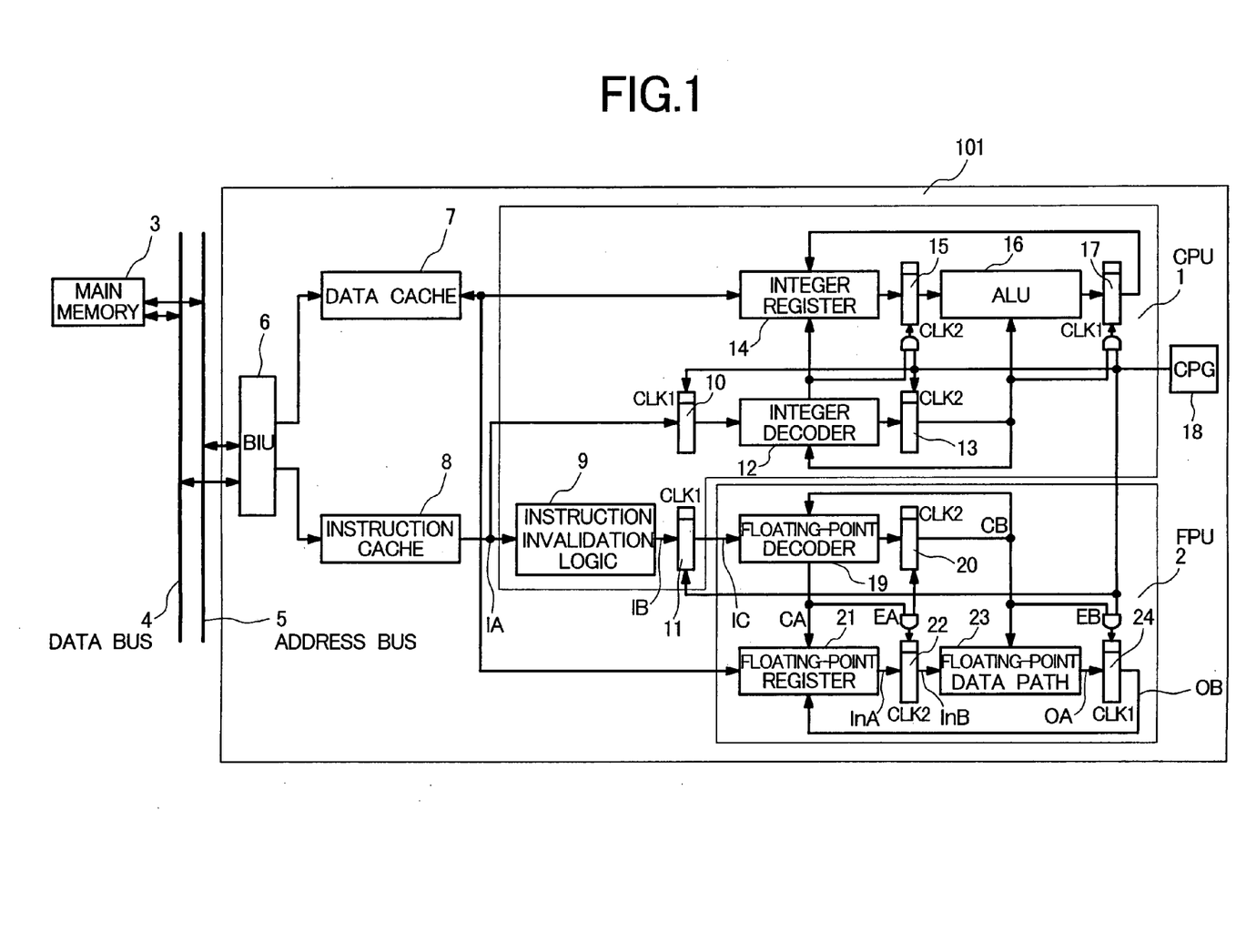
FIG. 1 is a block diagram showing the structure of the low power consumption microprocessor of the first embodiment of this invention.

FIG. 1 is a drawing showing the structure of the microprocessor and periphery. The microprocessor 101 is formed on one semiconductor substrate. The microprocessor is connected to a data bus 4 and an address bus 5 by way of a BIU (bus interface unit) 6. The data bus 4 and the address bus 5 are connected to the main memory 3 shown in the drawing. The structure of the data bus and address bus allows connection to external data buses of other than the main memory however such a connection is omitted in these specifications. The data bus, address bus and main memory may be formed on the same substrate as the microprocessor if the degree of integration on the semiconductor device permits such integration.

Besides the above mentioned BIU6, the microprocessor also has a data cache 7, an instruction cache 8, a CPU (central processing unit) 1, a floating point unit 2, and a CPG (clock pulse generator) 18. The microprocessor in addition to the above components may also contain a DMAC (direct memory access controller) to control the memory however the DMAC is omitted from these specifications and work drawings.

The FPU (floating point unit) formed inside the microprocessor is a co-processor for centralized calculation of the floating decimal point. However, the co-processor formed inside the microprocessor is not limited to an FPU and may be a dedicated circuit other than an FPU, such as a DSP (digital signal processor) for supplementing CPU operation. Further, there are no particular restrictions on this dedicated circuit, and the dedicated circuit may comprise a plurality of respective CPU that constitutes the microprocessor. In these specifications, the CPU of a plurality of CPU that make up the microprocessor may also be referred to as a co-processor provided that the circuit falls within the scope of this invention. In FIG. 1, the CPU and the FPU used as the co-processor are formed on the same semiconductor substrate but the co-processor may also be formed on a separate chip. The component mounting efficiency is lower when the co-processor is mounted on a separate chip however there is no need for a semiconductor device design for forming the CPU and the co-processor on the same chip, and to make production easier, a pre-existing co-processor chip can be connected to the CPU. In these specifications, for the sake of convenience, the CPU chip and the co-processor chip are together referred to as the microprocessor, even when the co-processor is mounted on a separate chip.

The program and data are stored in the main memory 3. The data bus 4 is a path for transferring data between the microprocessor and the memory. The address bus 5 is a path for transferring the address to the memory from the microprocessor when performing data transfer (exchange) between the microprocessor and memory. The BIU6 controls the address and data transfer between the main memory and the external data bus. The data cache 7 stores processed data or data processed in the FPU and the CPU inside the microprocessor. The instruction cache 8 stores instructions executed in the CPU and FPU. The CPG18 generates operating clock pulses for the CPU and FPU.

The detailed structure of a CPU1 and an FPU2 are shown hereafter. The CPU receives the instruction IA and stores instruction IA in an instruction register 10. The FPU in the same way, accepts the instruction IA from the instruction cache and stores it in the instruction register 11. The CPU instructions and the FPU instructions are stored in the same instruction cache. Instructions output from the instruction cache are supplied in parallel to the instruction register on the CPU side and the instruction register on the FPU side. A splitting means can be implemented to divide into respective registers. One method for splitting (or branching) is simply to split the wiring layers formed of metal and silicon compounds on the semiconductor substrate into respective identical widths but there are no particular restrictions on the means to be used. A CPU instruction register 10 and an FPU instruction register 11 are edged trigger latches that change at the rising edge of the CLK1 pulse generated by the CPG18. However, as shown in the drawing, the instruction invalidation logic circuit 9 which is the unique feature of this invention is formed between the instruction cache and the FPU side instruction register. The instruction invalidation logic circuit (abbreviated hereafter to invalidation circuit) is described later on. In the drawing, the instruction register 10 and the invalidation circuit are structured to receive instructions from the instruction cache but there are no particular restrictions, and a structure to receive the instructions directly from the memory may be used. The instruction register 11 of the FPU is formed inside the CPU however the instruction register 11 may be formed inside the FPU. When forming the FPU on the same semiconductor substrate as the CPU, or when connecting the FPU to the CPU as a separate chip the IP (intellectual property) differs according to whether or not an instruction register is formed in the FPU. Also, the invalidation circuit was formed on the CPU side, but when a co-processor other than the FPU is connected to the CPU, or when a FPU different from the previous one is connected, no modifications in the internal circuit of the FPU to be installed are needed if the invalidation circuit is inside the CPU, and adding the FPU is then simple. On the other hand if providing an FPU, then circuit modifications on the CPU side are not needed if an invalidation circuit is in the FPU circuit to be provided. In other words, changes can be made to form the invalidation circuit in either the CPU or the co-processor according to design and customer needs, etc. However, when the invalidation circuit and the register are formed inside the FPU, the instructions can be supplied without using the CPU as a path but in this case also the instructions are supplied to the FPU via the CPU for purposes of convenience in these specifications. Also, instructions are latched in the register 11 by way of the invalidation circuit when the FPU receives instructions from the memory, however the order of the invalidation circuit and the register 11 may also be reversed. Forming the invalidation before the instruction register has advantages and will be related later on. As mentioned previously, the structure of the CPU or FPU can be changed by the forming of an invalidation circuit and register inside.

The instruction fetched to the CPU instruction register 10 is sent to the integer decoder 12 inside the CPU and the instruction decoded. The integer decoder 12 outputs the read/write control signal of the integer register 14. The output control signal from the integer decoder 12 is latched by the latch means 13, and output as a control signal for calculation processing performed in the ALU16 (arithmetic logic unit). Also, in an instruction unrelated to the CPU such as an NOP (No Operation) instruction, control is performed in order to save power, by not rewriting the input latch 15 for the ALU and the output latch 17. More specifically, when the NOP instruction is not input into the integer decoder 12, the integer decoder 12 outputs a clock enable signal "0" (Here, "0" indicates disable.) to the input latch 15 of the ALU and the output latch 17, and rewriting of the latches is prevented by stopping the clock pulses. The instruction fetched to the FPU instruction register 11 on the other hand, is sent from the CPU model to the FPU module to be decoded with the floating-point decoder 19. The floating-point decoder 19 outputs the read/write control signal for the floating point unit 21. The floating point unit 21 holding the floating point data and the floating point calculation results, in compliance with the control signal CA, outputs data InA to the latch 22 and the data is latched. The data latched in the latch 22 is input to the floating-point data path 23 which is the calculation section. The control signal output from the floating-point decoder 19 is latched in the latch 20, and the contents of the latch 20 are output as a control signal CB on the floating-point data path. The latches 22 and 20 are edged latches that change with the rising edge of the CLK2 pulse output by the CPG18. The floating-point data path 23 is input with the data for calculating the floating point output by means of the latch 22, and the results of the floating point calculation OA are latched by the latch 24. The latch 24 is an edged latch that changes with the rising edge of the CLK1 pulse. The output OB from the latch 24 is input to the register 21 and the calculation results are written in the register. A data path input latch 22 and a data path output latch 24 are respectively controlled so that the latches are rewritten by the latch enable signals EA or EB. These latch enable signals EA and EB are respectively generated from the outputs of the floating-point decoder and the floating-point decoder latch. When the instruction input to the floating-point decoder is an NOP instruction then EA=EB=0 is output from the decoding, and the supply of clock pulses to the floating-point data path input latch is stopped by a logic AND operation with the clock signal. When the instruction is not a NOP signal, EA=EB=1 is output and clock pulses are supplied to the floating-point data path input latch. The integer decoder and the floating-point decoder mentioned above are decoders generally referred to as instruction decoders. An instruction decoder generates a signal for controlling devices such as latch circuits for latching data output from processors input from other processors (calculating units) and processors receiving instructions from the instruction register.

The instruction invalidation logic circuit (or invalidation circuit) 9 inside the CPU module and a unique feature of this invention is described next. An instruction loaded from the instruction cache as described above, is fetched to the CPU instruction register 10 and simultaneously input to the invalidation circuit of the FPU. In this case, when instructions relating only to the CPU and not relating to the FPU are loaded (read-out) from the instruction cache, the invalidation circuit 9 outputs a NOP instruction for the FPU instruction register. In other words, when an instruction does not relate to the FPU, an NOP instruction is fetched to the FPU instruction register. NOP instructions are constantly fetched to the FPU instruction register when instructions not relating to the FPU are continuously sent from the instruction cache. The floating-point decoder 19 of the FPU module therefore performs decoding only of continuous NOP instructions, while instructions not relating to the FPU are being processed in the CPU. In other words, since no switching operations are being performed in the decoder, no through-current from switching operation flows in the circuit, and low power consumption can be achieved.

Also, in the NOP instruction, a latch enable signal EA or EB are utilized to keep the floating-point data path input latch 22 and the output latch 24 from being rewritten, so that when the NOP instruction is continuous, the decoding control signals CA and CB are a fixed level, and switching of the latches will not be performed. The input/output data InB and OB for the data path are also made a fixed level so that the input/output latches for the data path will not be rewritten. The input data and the control signal do not change at this time so that no switching is performed on the data path and low power consumption is possible.

Figure 2:
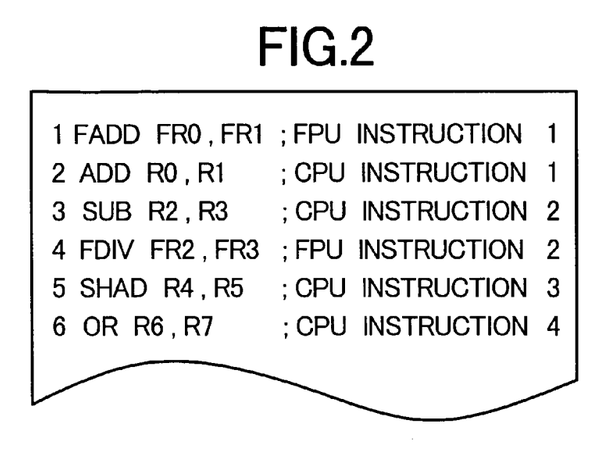
FIG. 2 is a drawing showing an instruction string forming the input of the instruction invalidation circuit of this invention.
Figure 3:
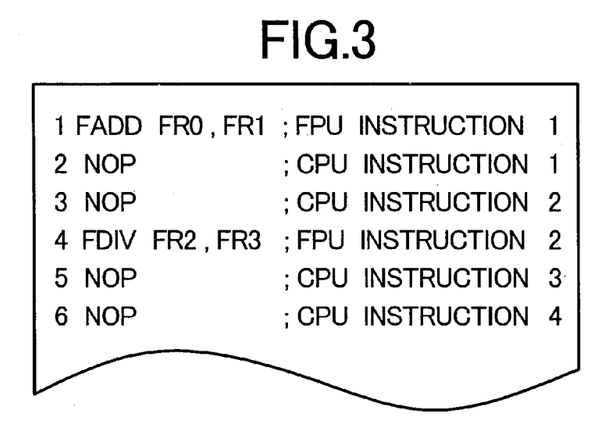
FIG. 3 is a drawing showing an instruction string forming the output of the instruction invalidation circuit of this invention.

A typical instruction code string output to the CPU from the instruction cache of FIG. 1 is shown in FIG. 2. The operation of the instruction invalidation circuit connected to the floating-point register utilizing the instruction code string is shown. The integer instruction (CPU instruction) and the floating point calculation instruction (FPU instruction) are both present in the instruction code string of FIG. 2. As shown in the figure, the CPU instruction and the FPU instruction in a mixed state are sent in sequence to the CPU from the instruction cache. In the above described instruction invalidation circuit, an instruction unrelated to the FPU is substituted for an invalid NOP instruction from among the instruction code strings shown in FIG. 2 sent from the instruction cache. The substituted instruction code string is shown in FIG. 3. In other words, the instruction code string shown in FIG. 2 is input to the CPU instruction register 10 of FIG. 1; and the instruction code string of FIG. 3 is input to the FPU instruction register 11 of FIG. 1. The 1st and the 4th FPU instructions of the instruction code string of FIG. 2, are output unchanged to the FPU instruction register, and the other CPU instructions are output to the FPU register holding commands uniformly substituted into NOP instructions.

Figure 4:
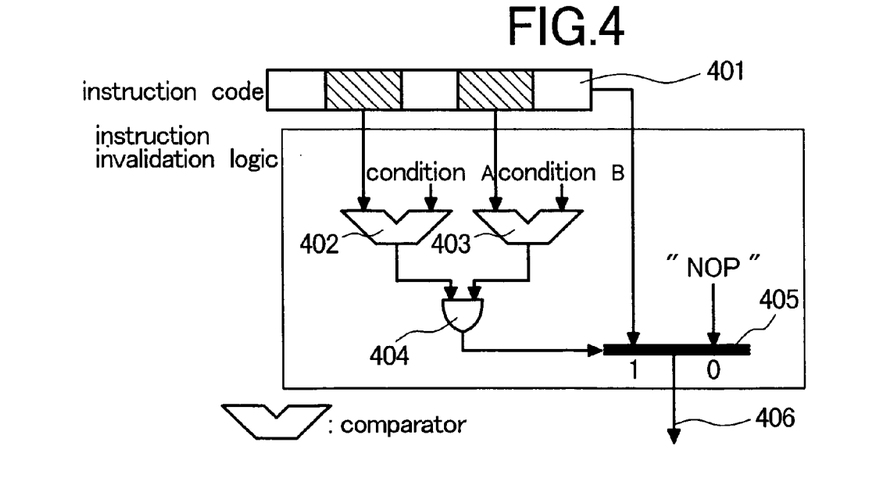
FIG. 4 is a drawing showing the invalidation circuit of this invention.

FIG. 4 shows in more detail the structure of the instruction invalidation circuit for processing the instructions that are input. The instructions respectively sent from the instruction cache are listed in the instruction code format shown in the figure. When the two sections with the slanted lines in the instruction code simultaneously satisfy respectively condition A and condition B, that instruction is assumed to be an FPU instruction. When the instruction code 401 is input to the instruction invalidation circuit, the comparators 402, 403 determine whether the slanted line sections satisfy condition A and condition B. The outputs of the comparators are summed by the AND gate 404 and a determination made as to whether the instruction code 401 that is input is an FPU instruction or not. When the condition A and the condition B are both present, the instruction code 401 input into the instruction invalidation circuit, is selected by the selector 405, and then output to the FPU instruction register as the instruction invalidation circuit output. When the condition A and condition B are not present (not satisfied), the instruction that is input is determined to be an instruction unrelated to the FPU, and the instruction invalidation circuit outputs an NOP instruction to the FPU instruction register. In some cases, whether or not an instruction is an FPU instruction can be determined according to the instruction format, by referring to one bit of the instruction code. In such cases, the comparators of FIG. 4 are unnecessary, and the instruction invalidation circuit can be configured with a control signal from the selector, with one bit showing whether or not the instruction is an FPU instruction. The structure of the invalidation circuit for processing the instructions is limited by the type of instructions controlling the FPU, from among the instruction codes of the microprocessor, however various adaptations are allowable providing these variations do not depart from the scope and spirit of the invention.

In this embodiment, the instruction invalidation circuit is formed between the instruction cache and the instruction register, however there are no particular restrictions and the instruction invalidation circuit can for example be formed inside the floating-point decoder. In this case, the invalidation circuit 9 of FIG. 1 is formed inside the floating-point decoder 19. In this case also, the invalidation circuit determines based on the specified bit of instruction code 401, whether or not the instruction input for decoding is an FPU instruction or not, and if the instruction that is input is an FPU instruction then it is decoded and FPU calculation performed. On the other hand, when determined by means of the specified bit that the instruction that is input is not an FPU instruction, an NOP instruction is output for the instruction decode means.

Figure 5:
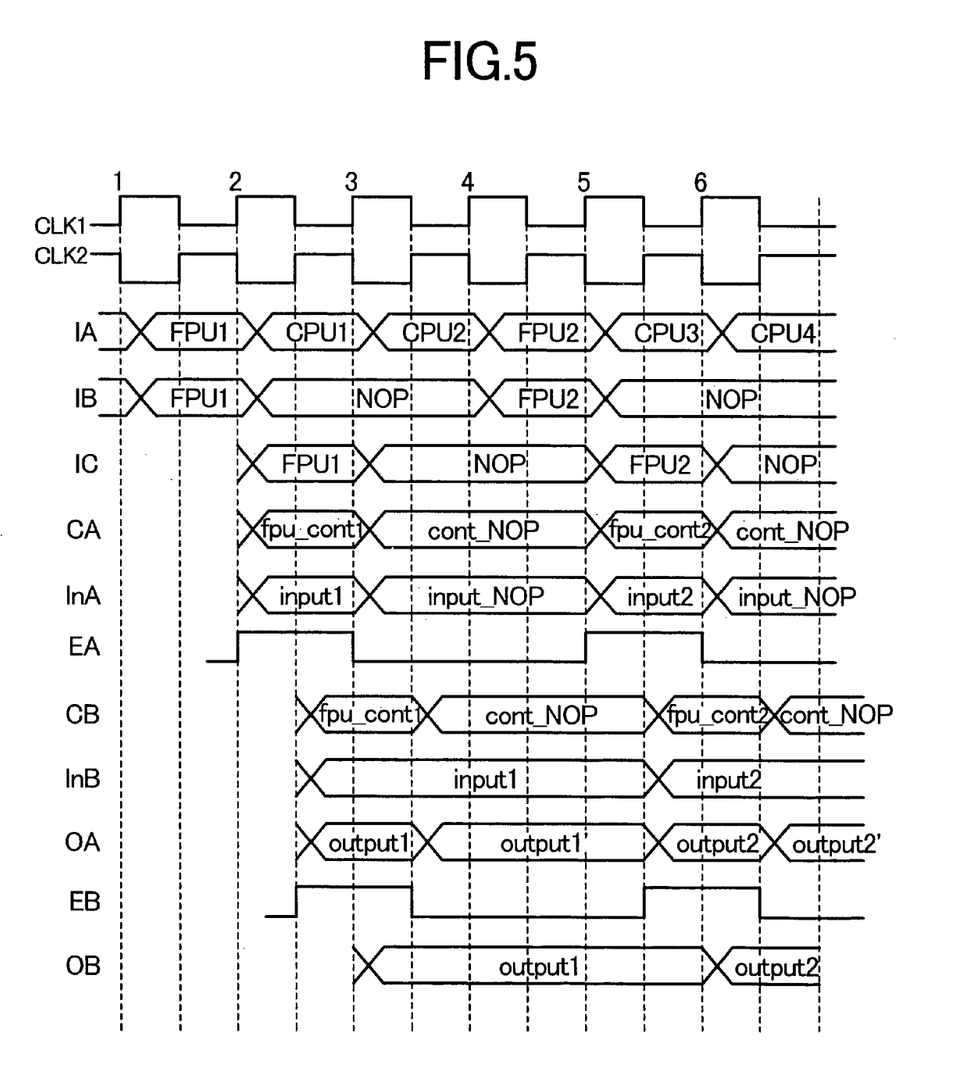
FIG. 5 is a timing chart for the structure shown in FIG. 1.

The power saving (low power consumption) feature of the floating point unit achieved by means of the instruction invalidation circuit of FIG. 1 is shown by using the timing chart of FIG. 5. The instruction string fetched from the instruction cache is identical to that in FIG. 2. The operation for the floating point instruction is explained first. Here, the input and output for the floating point invalidation circuit are respectively IA and IB. The CPU instruction is substituted with an NOP instruction, and the FPU instruction is output unchanged so that IB becomes the same instruction string as in FIG. 3. The output IB is input to the FPU instruction register 11 and the instruction code IC is output. When IC is the FPU1 instruction (time=3,3 in FIG. 5), the floating-point decoder 19 outputs an FPU1 instruction control signal fpu_cont1 as the control signal CA for performing FPU1 calculation at time=3 with the floating-point data path circuit. When the control signal CA is fpu_cont1, the input data input1 is loaded (read out) from the floating-point register 21 at time=3, and output to the latch 22. After the floating-point data path control signal CB is latched in the control signal latch 20, an FPU1 instruction control signal fpu_cont1 is output. On the data path for the floating point, since the input latch 22 of the enable signal EA=1 and the output latch 24 of the enable signal EB=1, with the input InB as input1 at time=4, FPU1 calculation is performed in the floating-point data path circuit, the output latch 24 latches with the output1 result, and is output as OB time=5.

The CPU instruction operation for the FPU is next described. The input and output for the floating point invalidation circuit are respectively IA and IB. The CPU instruction is substituted with an NOP instruction the same as in FIG. 3. The floating-point register 11 is input with IB, and outputs an instruction code IC. When the IC is an NOP instruction (time=5), the floating-point decoder 19 outputs a control signal cont_NOP at time=5, as the control signal CA so that calculation will not be performed. InA is read out from the floating-point register file 21 by means of the control signal CA, and input to the latch 22. When the control signal CA is a cont_NOP, the register value is read out from the instruction code of the NOP instruction, and the input value becomes input_NOP. The clock signal of the floating-point data path input latch 22 is summed by logic AND operation with the CLK2 and enable signal EA from the CPG, and unrelated latches are not rewritten in the calculation. In the case of a NOP instruction, the control signal CA is a cont_NOP, and EA=0. The output of the latch 22 or in other words InB is not rewritten.

In other words, during a NOP instruction (time=6 through 9), the InB output of the latch 22 is input1 the same as the FPU1 instruction. Since the latch 20 is constantly rewritten, the floating-point data path control signal outputs a cont_NOP in the case of an NOP instruction. The input of the floating-point data path circuit 23 is InB and the control signal is CB, so the input is input1 and the time=4 the same as the FPU1 instruction however the control signal is different from FPU_cont1 to cont_NOP so that the output OA is time=6 through 9 and output1 *. The clock signal for the output latch 24 of the floating-point data path is summed by logic AND operation of CLK1 and the enable signal EB, so that unrelated latches are not rewritten in the calculation, the same as with floating-point data path input latch 22. During the NOP instruction, at time 6 through 9, EB=0, so output OB of the non-rewritten latch 24 is fixed at output1.

When the CPU instructions are continuous as above, they are substituted with continuous NOP instructions in the invalidation circuit, and the floating-point data path input InB and the data path control signal CB are fixed, and switching of the data path circuit is not performed. Also, the floating point decode input IC is fixed, and switching is not performed in the floating-point register and the floating-point decoder. A reduction in power consumption can therefore be achieved in the data path circuit, the floating-point decoder and the floating-point register. The number of switchings occurring in the floating-point data path input/output latch 22, 24 is reduced, even if the FPU instruction and CPU instructions are alternately arrayed and low power consumption can be achieved.

The instruction invalidation circuit of this invention may be installed in a prestage of the instruction register, and no internal changes made in the FPU.

Figure 6:
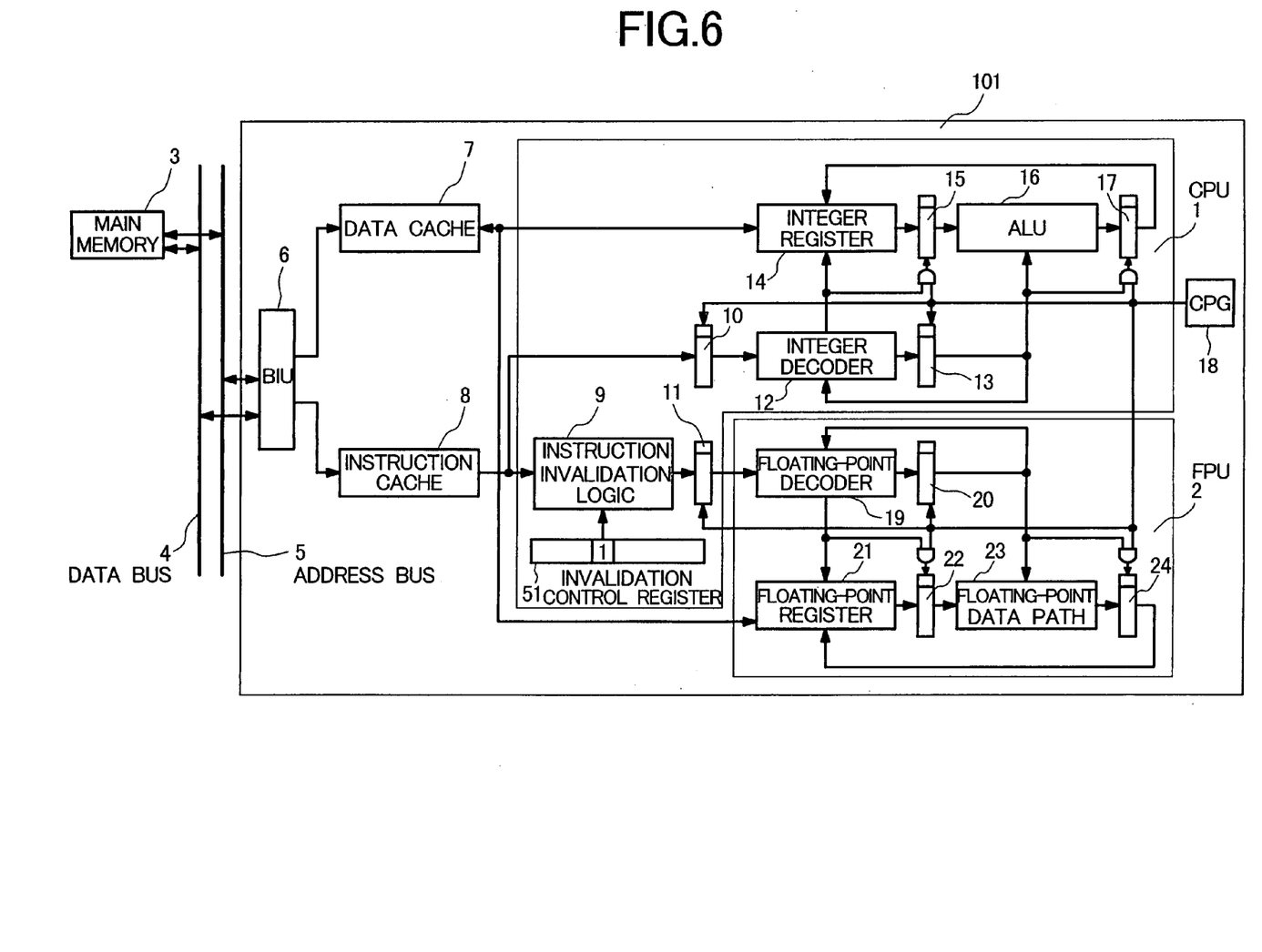
FIG. 6 is a block diagram showing the structure of the low power consumption microprocessor containing an invalidation circuit utilizing an invalidation control register of the second embodiment of this invention.

Another embodiment of this invention is shown in FIG. 6. In this embodiment, the invalidation circuit is comprised of an invalidation control register, instead of the decode method of FIG. 1. More specifically, in a microprocessor having an FPU (floating point unit) the low power consumption feature (or power device) of the floating point unit is comprised of an invalidation circuit utilizing an invalidation register. In the unique feature of this embodiment shown in FIG. 6, in contrast to the structure shown in FIG. 1, the invalidation circuit is controlled by providing an invalidation register to determine whether each module is valid or invalid. The instruction code invalidation circuit 9 for the module set to invalid (1) in the invalidation control register 51, is set to active. If the invalidation control register is rewritten by the software, then the instruction codes of the modules can be set to invalid with the software. The point of difference of the embodiment of FIG. 1 with the embodiment of FIG. 6 is that the embodiment of FIG. 1 detects instructions unrelated to the FPU module, and substitutes these unrelated instructions in the module with NOP instructions, while for input of the instruction register, in the embodiment of FIG. 6, in the module set to invalid in the invalidation control register, the instruction codes are replaced unconditionally with NOP instructions, and the inputs set for the instruction register.

Figure 7:
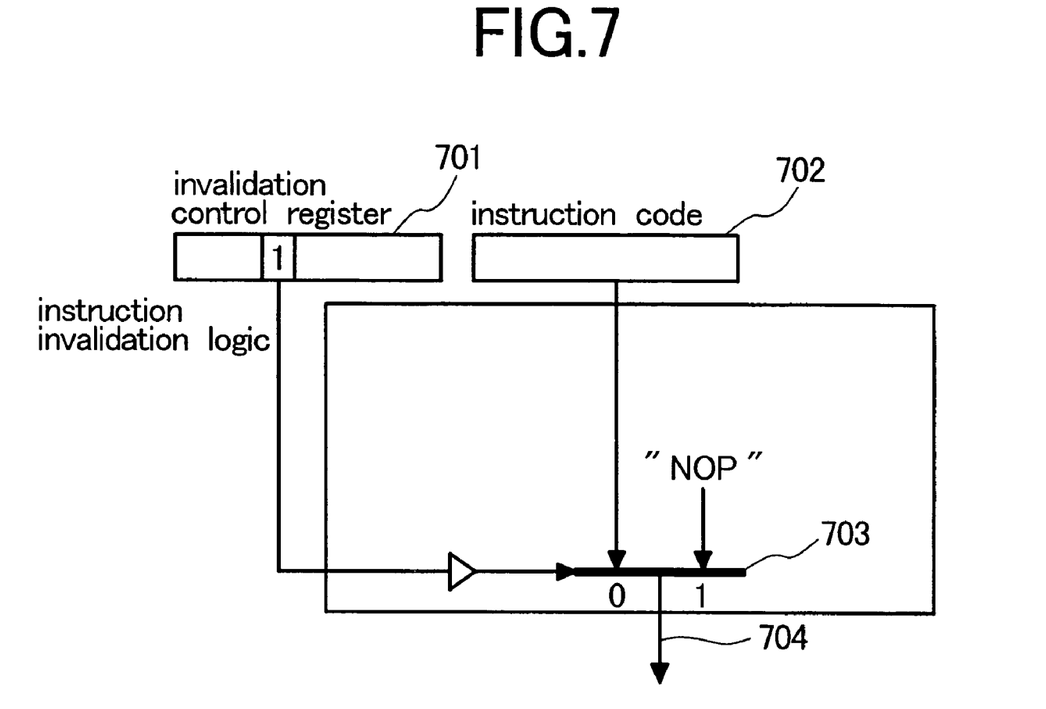
FIG. 7 is a concept drawing showing the invalidation circuit utilizing an invalidation control register of this invention.

The structure of the instruction invalidation circuit of FIG. 6 is shown in FIG. 7. An instruction code 702 is input from the instruction cache, and the output from the invalidation control register 701 is set as the selector control signal, and when the module in the invalidation control register is set to invalid (1), an NOP instruction is selected with the selector 703, and when the module is set to valid (0), the instruction code is selected, and becomes the instruction invalidation circuit output 704. Other sections of the circuit are identical to FIG. 1, and the timing chart is identical to FIG. 5. The embodiment of FIG. 6 has a simple instruction invalidation circuit compared to the embodiment of FIG. 1 however the related overhead increases due to changes in the invalidation instruction register. Of course, the embodiment of FIG. 6 and the embodiment of FIG. 1 can also be combined. More specifically, when the module was set to invalid in the invalidation control register, just as with the embodiment of FIG. 6, NOP instructions are unconditionally output to the applicable module. However, when the module in the invalidation control register was set to valid also, just as with the embodiment of FIG. 1, then unrelated instructions in the applicable module are output as NOP instructions to the applicable module. The circuit configuration is complex in this type of structure but finer low power consumption control is possible.

Figure 8:
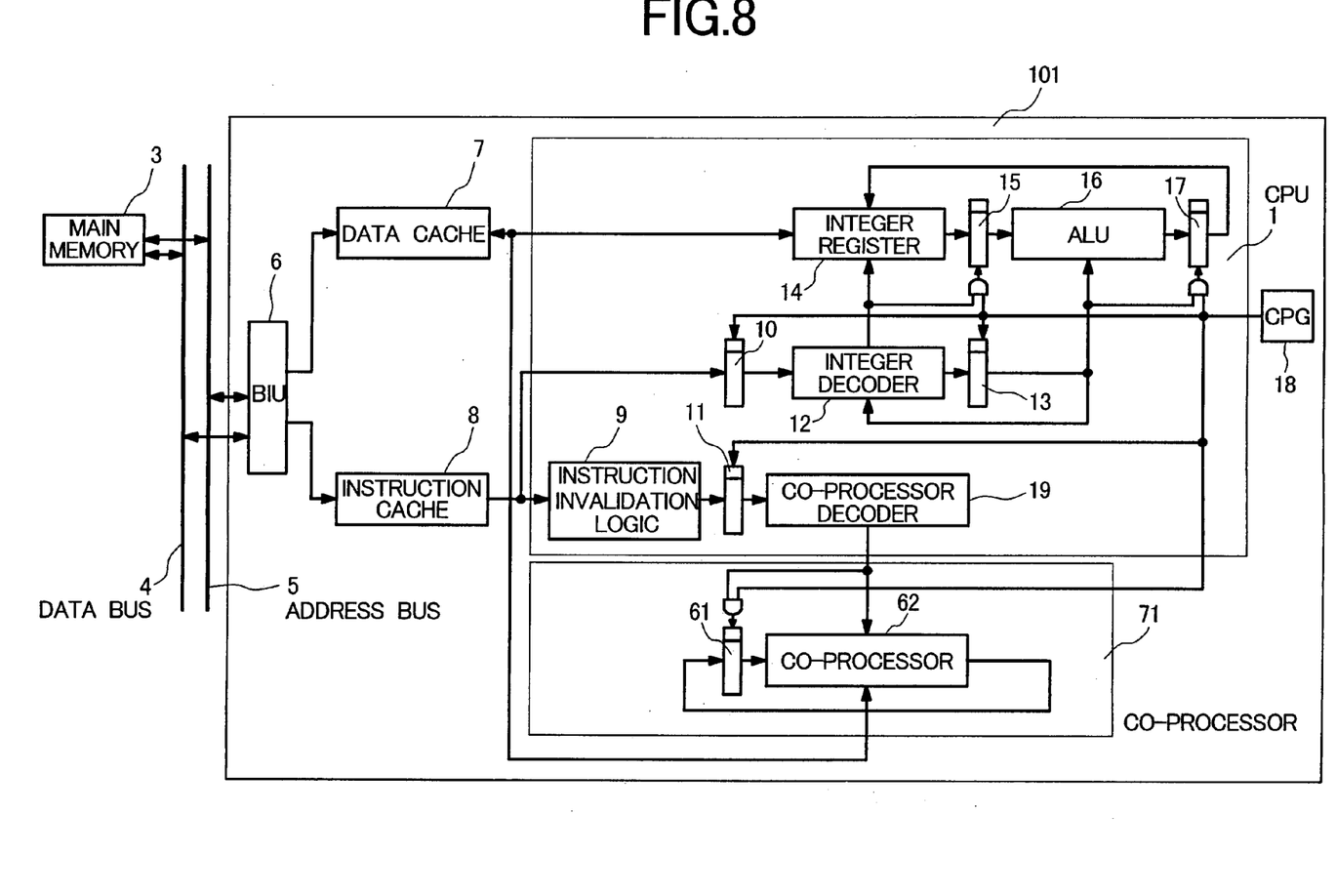
FIG. 8 is a block diagram showing the structure of the low power consumption microprocessor containing an invalidation circuit of the third embodiment of this invention.

A third embodiment of this invention of a microprocessor having a co-processor 71 is shown in FIG. 8. Compared to FIG. 1, the unique feature of the embodiment shown in FIG. 8 is that a decoder 19 for the co-processor is provided inside the CPU module. Instructions unrelated to the co-processor 71 are substituted with NOP instructions in the invalidation circuit and output to the co-processor decoder. Instructions unrelated to the co-processor, in other words, NOP instruction are continuous and the power consumption in the decoder is reduced. Also, the control signal of the co-processor 62 are fixed, and since the latch 61 of the co-processor 61 is not rewritten, the switching count of the latch 61 decreases, and the power consumption can also be reduced. The same structure as for the co-processor invalidation circuit of FIG. 4 can be used. In this embodiment, an instruction decoder is not provided inside the co-processor module so that when using a co-processor as an IP (intellectual property) a wide range of selections for an IP are available compared to the first embodiment.

Figure 9:
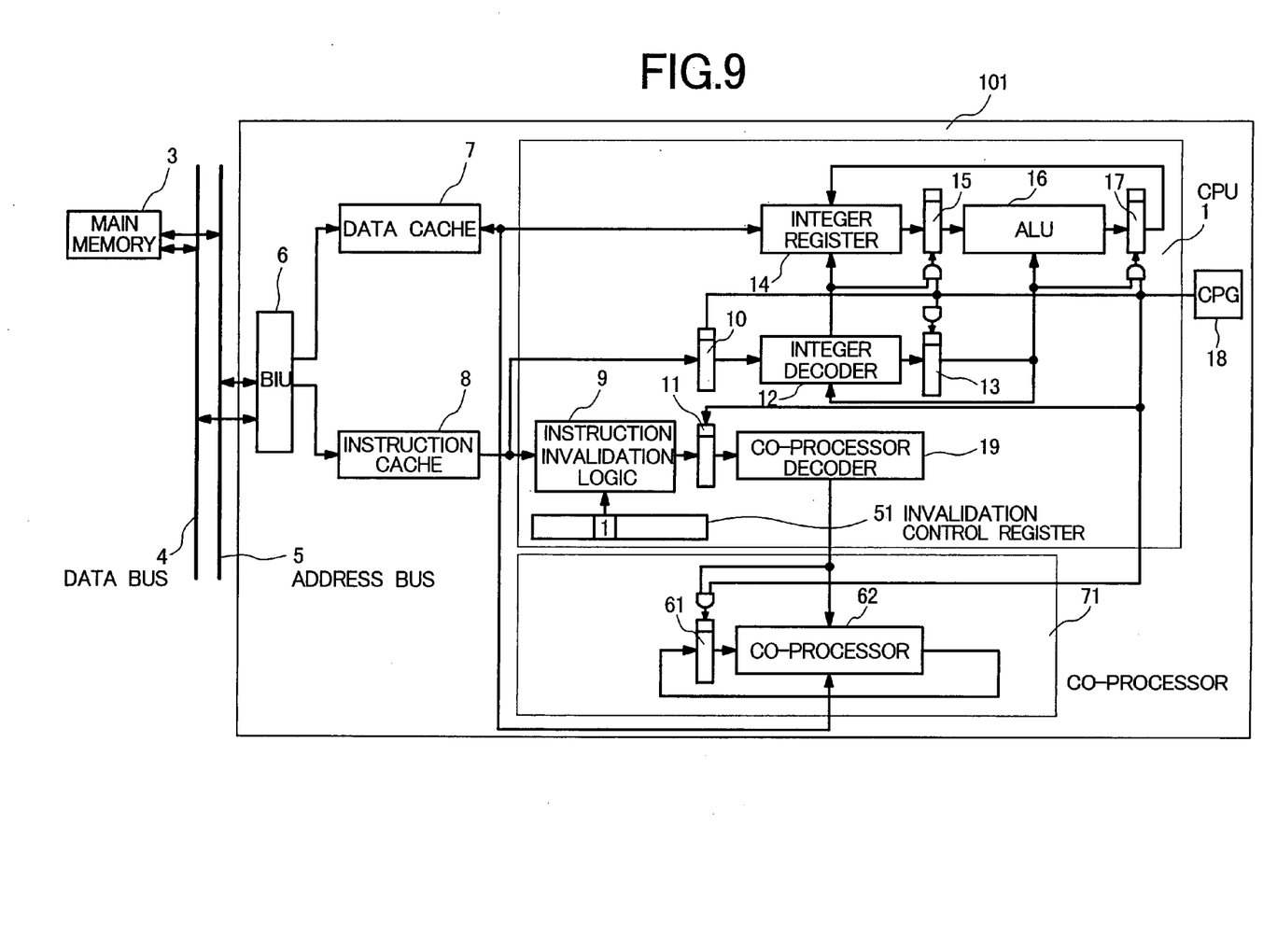
FIG. 9 is a block diagram showing the structure of the low power consumption microprocessor containing an invalidation circuit of the fourth embodiment of this invention.

The fourth embodiment of this invention is shown in FIG. 9. The unique feature of the embodiment shown in FIG. 9, in contrast to the microprocessor having the co-processor 71 in FIG. 8, is that an invalidation control register is provided for determining whether each module is valid or invalid, and to control the invalidation circuit. The circuit structure of the invalidation circuit is the same as in FIG. 7. The design of the invalidation circuit is simple compared to that of FIG. 8 however, the overhead becomes larger due to making changes in the invalidation instruction register.

Figure 10:
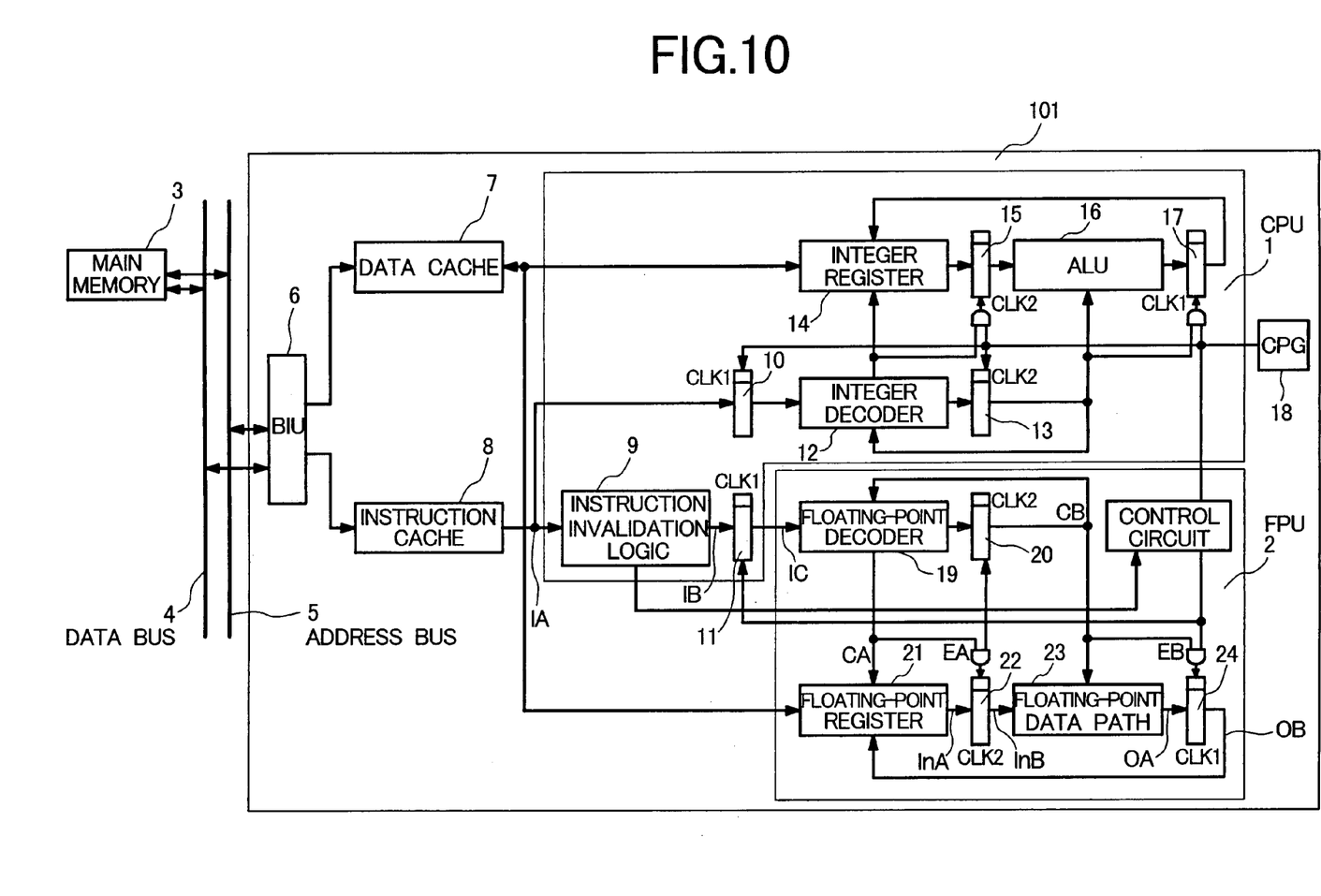
FIG. 10 is a block diagram showing the structure of the low power consumption microprocessor containing an invalidation circuit of the fifth embodiment of this invention.

Another embodiment is shown in FIG. 10. As with the other embodiments, the invalidation circuit outputs NOP instructions however output of other than NOP instructions is possible. More specifically, the supply of clock pulse to the register 11 can be stopped. If the supply of clock pulses was cut off to the register 11 instead of outputting NOP instructions, then changes will not be possible in the instructions being supplied to the decoder. In other words, if instructions input to the invalidation circuit are instructions unrelated to the FPU, then control signals are output by the control circuit. The input of control signals from the control circuit stops the supply of clock pulse to the register 11. The instructions supplied to the decoder are therefore fixed, the switching count (amount of switching) inside the decoder decreases, and power consumption in the decoder is reduced. In this case, with the supply of clock pulses stopped to the registers 20, 22, and 24 when NOP instructions are input to the decoder, the state is therefore the same as when NOP instructions are supplied to the decoder so that the supply of clock pulses to the registers 20, 22, and 24 can also be stopped. The power consumption can therefore decrease in the registers 20, 22, and 24. The control circuits are formed between CPG18 and the registers and each latch. A control circuit was formed on the FPU module side but of course, may also be formed on the CPU side.

Also, though not shown in the drawing, a further embodiment is possible. For example when the FPU is input with an instruction unrelated to the FPU, the supply of instructions to the decoder can be stopped. More specifically, a method can be used in which a cutoff circuit is formed in a prestage of the decoder, and when instructions unrelated to the FPU are input to the invalidation circuit, the connection between the decoder and register, or between the register and invalidation circuit can be opened by the cutoff circuit. This method is more reliable for stopping the decoder operation. Further, by forming the cutoff circuit prior to instruction register, the power consumption in the instruction register can also be reduced. This embodiment also specifically mentioned the NOP instruction as one of the instructions however this is not to say the NOP is specially designated as an instruction. When an instruction unrelated to an FPU instruction for instance, is input to the invalidation circuit, all such instructions can be supplied to the decoder as a "1" code, by the selection means. The amount of switching (or switching count) of the decoder also decreases in this case, and the power consumption in the decoder can be reduced. Of course, a "0" can be used rather than a "1", and other codes can also be designated. Also, during fixed decoding when an instruction other than an FPU instruction is input, the FPU instruction code can be referred to, and the code most capable of reducing the switching count can be calculated by simulation or similar method and that code then also be supplied to the invalidation circuit by the decoder. This method has a larger effect in reducing power consumption.

In the above embodiment, the instruction invalidation circuit was formed prior to the decoder of the co-processor, more specifically on the FPU side, however the invalidation circuit may also be formed in a prestage of the decoder on the CPU side. A NOP instruction can thus be supplied to the CPU instruction register, while an instruction unrelated to the CPU, in other words, a coprocessor instruction is handled in the co-processor. Here, the switching count (or amount of switching) by the integer decoder of the CPU can decrease, and reduced CPU power consumption can also be achieved. An even further reduction in power can be anticipated by fixing the data path latches on the CPU side. Also, by using this method along with the method for stopping the decoding in the co-processor decoder an even further reduction in power consumption can be expected. Further, by forming the invalidation circuits of this invention in a plurality of instruction decoders, in a microprocessor comprised of a combination of a plurality of CPU and a plurality of co-processors, the power consumption of these respective processing devices can be reduced, and an overall reduction in power consumption can be achieved. This invention is also applicable to a single CPU.

This embodiment further described stopping the switching in the decoder by means of consecutive NOP instructions but may also include the case when the amount of switching is reduced compared to when an unrelated instruction is input to the processing device. A method may function so that when instructions unrelated to the processor are input to the invalidation circuit, a first instruction is converted to a NOP 1 instruction, a second instruction to a NOP2 instruction, a third instruction is converted to a NOP3 instruction, and a fourth instruction is converted to a NOP1 instruction again, so that even if just decoders with few transistors are operated, a reduction in power consumption can be expected compared to when unrelated instructions are input into the decoder. In other words, these instructions are also essentially handled as the NOP instructions described in these specifications. Of course, a "1" or a "0" conforming to the NOP instructions or fixed instructions such as instructions determined based on co-processor instructions can be used in the same way.

Specific embodiments of the invention were related however this invention is not limited by these specific examples, and various embodiment for reducing power consumption in the decoder are applicable within the spirit and scope of this invention.

Further, by installing the above described microprocessor in portable electronic equipment driven by batteries such as portable telephones and PDA and mobile computers, the power consumption of the portable electronic equipment can be reduced, the operating time on these batteries can be extended and the convenience and functions of this portable electronic equipment improved.

The microprocessor of the above described invention having an FPU, substitutes instructions unrelated to the FPU, with uniform NOP instructions and supplies these NOP instructions to the FPU, by means of the invalidation circuit of this invention. In this way, when input with instructions unrelated to the FPU, the NOP instructions are supplied to the FPU instruction decoder, the amount of transistor switching performed in the floating point decoder is reduced, and a reduction in power consumption can be achieved. In the same way, in a microprocessor having a co-processor, the power consumption of the co-processor can be reduced by means of the invalidation circuit of this invention. Also, for the CPU, by providing an instruction invalidation circuit in a prestage of the CPU instruction decoder, instructions unrelated to the CPU, such as floating point calculation instructions can be substituted with NOP instructions and the power consumption reduced in the CPU instruction decoder for the same reasons. These instruction invalidation circuits can also be configured as additional circuits so that modifications of the interior of the FPU or the co-processor are not required. Therefore, not only can the amount of man-hours required for checking and verifying new designs be reduced but already existing circuits can be utilized.

Furthermore, by incorporating the microprocessor of this invention into microprocessor systems such as portable information devices, low power consumption can be achieved in portable electronic devices, etc.

What is claimed is:

1. A microprocessor comprising:
   a first cache memory;
   a first instruction fetch unit coupled to the first cache memory;
   a first instruction decoder coupled to the first instruction fetch unit;
   a first processing unit coupled to the first instruction decoder; and
   a first latch adapted to hold a control signal outputted from the first instruction decoder,
   wherein, when the first instruction fetch unit is inputted with a first instruction which is performed by the first processing unit, the first instruction fetch unit outputs the first instruction to the first instruction decoder;
   wherein, when the first instruction fetch unit is inputted with a second instruction which is not performed by the first processing unit, the first instruction fetch unit outputs a specific instruction to the first instruction decoder;
   wherein the first processing unit has a second latch which stores data for calculation and a third latch which stores the calculation result; and
   wherein, in the case where the first instruction fetch unit outouts the specific instruction to the first instruction decoder, the supply of the clock pulse to the second latch is halted based on the control signal outputted from the first instruction decoder and the supply of the clock pulse to the third latch is halted based on the control signal outputted from the first latch.

2. A microprocessor according to claim 1,
   wherein the first instruction decoder outputs the control signal when the specific instruction is inputted from the first instruction fetch unit.

3. A microprocessor according to claim 1, further comprising:

a second instruction fetch unit coupled to the cache memory;

a second instruction decoder coupled to the second instruction fetch unit; and a second processing unit coupled to the second instruction decoder;

wherein, when the cache memory outputs the second instruction to the first and second instruction fetch unit, the second instruction is performed by the second processing unit.

4. A microprocessor according to claim 1, wherein the specific instruction is an NOP instruction.

5. A microprocessor according to claim 1, wherein the first processing unit is a floating point unit.

6. A microprocessor according to claim 1, wherein the first instruction fetch unit has an invalidation circuit which determines whether or not an inputted instruction is the second instruction by referring to an instruction code of the inputted instruction and outputs the specific instruction if the inputted instruction is the second instruction.

7. A microprocessor according to claim 6, further comprising:

wherein the first instruction fetch unit further includes a register, wherein, when the register holds a flag which indicates that the first processing unit is invalid, the first instruction fetch unit outputs the specific instruction regardless of being inputted to the first instruction or the second instruction from the cache memory.

* * * * *